United States Patent [19]
Laube

[11] Patent Number: 5,506,558
[45] Date of Patent: Apr. 9, 1996

[54] UNIPOLAR COMPOSITE MAGNETS

[76] Inventor: Hans-Jürgen Laube, Alte Bommenstrasse 62, CH-8573 Siegershausen, Switzerland

[21] Appl. No.: 247,113

[22] Filed: May 4, 1994

Related U.S. Application Data

[63] Continuation of Ser. No. 911,658, Jul. 13, 1992, abandoned.

[30] Foreign Application Priority Data

Jul. 11, 1991 [CH]  Switzerland ........................ 02072/91

[51] Int. Cl.⁶ .............................. H01F 7/02; H01F 7/20; H02K 7/09
[52] U.S. Cl. ...................... 335/306; 335/304; 335/285; 310/90.5
[58] Field of Search .................................. 335/285, 286, 335/288, 303, 302, 306; 310/90.5

[56] References Cited

U.S. PATENT DOCUMENTS

| | | | |
|---|---|---|---|
| 3,827,021 | 7/1974 | Phelon | 335/285 |
| 4,222,021 | 9/1980 | Bunker, Jr. | 335/296 |
| 4,543,551 | 9/1985 | Petersen | 335/284 |
| 4,568,901 | 2/1986 | Adam | 335/305 |
| 4,859,976 | 8/1989 | Leupold | 335/306 |
| 5,180,557 | 1/1993 | Priestley | 422/139 |
| 5,210,373 | 5/1993 | Weber . | |
| 5,235,243 | 8/1993 | Tong | 313/479 |
| 5,294,826 | 3/1994 | Marcantonio | 257/659 |

FOREIGN PATENT DOCUMENTS

| | | | |
|---|---|---|---|
| 0034254 | 8/1981 | European Pat. Off. | B05B 5/04 |
| 0054617 | 6/1982 | European Pat. Off. | F16C 32/04 |
| 0178025 | 4/1986 | European Pat. Off. | H01F 7/02 |
| 966341 | 7/1957 | Germany | 335/303 |
| 3204503A1 | 8/1983 | Germany | H01F 7/02 |
| 55-60719 | 5/1980 | Japan . | |
| 60-252820 | 5/1986 | Japan | F16C 32/04 |
| 60133602 | 10/1988 | Japan | H01F 7/02 |
| 961725 | 11/1960 | United Kingdom | 335/303 |
| 935215 | 8/1963 | United Kingdom . | |
| 2124033 | 2/1984 | United Kingdom | H01F 7/02 |

OTHER PUBLICATIONS

*Electricity + Magnetism*, p. E–128, Author/date unknown.

Primary Examiner—Michael W. Phillips
Assistant Examiner—Stephen T. Ryan
Attorney, Agent, or Firm—Darby & Darby

[57] ABSTRACT

A unipolar magnet is composed of a plurality of magnetic units. Each magnetic unit is made up of a magnetic body, a paramagnetic or diamagnetic first layer which covers the entire magnetic body except for one of the poles, and a magnetically conductive second layer overlying the first layer. The exposed poles of all the magnetic units have the same polarity and together define a peripheral surface of the magnet. The magnetic units can have the configuration of a segment of a ring and can be assembled to form an annular first magnet whose external peripheral surface is constituted by the exposed poles. Several of these annular first magnets can be superimposed to form a hollow cylinder, and such a cylinder can be used to construct a shaft capable of floating in a housing. To this end, the housing is provided with annular second magnets which surround the first magnets. The internal peripheral surfaces of the second magnets have the same polarity as the external peripheral surfaces of the first magnets thereby causing the shaft to float radially. The housing and the shaft are provided with additional magnets which are superimposed with one another as considered in axial direction of the shaft. Each additional magnet on the shaft confronts an additional magnet on the housing. The confronting magnets are arranged with like poles facing one another thereby causing the shaft to float axially.

6 Claims, 9 Drawing Sheets

UNIPOLAR COMPOSITE MAGNETS

This is a continuation, of application Ser. No. 07/911,658, filed Jul. 13, 1992, now abandoned

BACKGROUND OF THE INVENTION

The invention relates generally to magnets.

More particularly, the invention relates to composite magnets and to devices with floating magnetic bearings.

Magnets made of iron, neodymium, Sm2Co17, etc. are known. They are mostly in the form of a rod, a needle or a horseshoe. In these magnets, the two ends contain the north pole and the south pole, respectively. The magnetic field lines flow from pole to pole, and some of these field lines extend outwards of the magnet. The curved shape of the magnetic field lines is known and can be easily depicted by spreading steel chips on a piece of paper or by appropriate measuring instruments. These phenomena indicate that a conventional magnet is unable to provide a magnetic field having a unipolar region, i.e., the north pole is always significantly influenced by the south pole and vice versa.

The British patent specification 935,215 discloses pyramidal magnets whose height equals one-half the length of the base. The tips of the pyramids contain one pole and the bases contain the other pole. Six identical pyramids are combined to form a cube whose surface is presumed to have only the polarity of the bases of the individual pyramids. The opposite pole is presumed to be in the center of the cube. Based on the recognition that the field lines of a magnet run from the north pole to the south pole externally of the magnet, it follows that the surface of a cube according to the British patent specification is not unipolar. Instead, if it is even possible to assemble the pyramids, the surface of the resulting cube has north and south poles. Precise measurements with the most modern measuring instruments have confirmed this. Accordingly, unipolarity cannot be achieved with these teachings.

U.S. Pat. No. 4,222,021 discloses a magnet which, in principle, is assembled in the same manner from a set of individual magnetic bodies. A difference is that the center of the magnet of the U.S. patent has a cavity whose surface is presumed to be magnetized oppositely to the outer surface of the magnet. As indicated by measurements, the magnet obtained upon assembly of the individual magnetic bodies again has an outer surface with a north pole and a south pole or with several regions which are partially north and partially south. Moreover, the strength of such composite magnets is substantially less than that of the individual magnetic bodies constituting the same. A unipolar outer surface cannot be achieved with a magnet constructed according to this U.S. patent.

Also known are magnets in which one of the two poles, as well as the portion of the magnet between the poles, is surrounded by a jacket. The magnetic field of the covered pole is thus shielded and the normal curvature of the field lines from pole to pole is sharply reduced. The field lines run almost exclusively inside the pot-shaped shield, and a short circuit of the field lines occurs therein. Such magnets are used in electronic instruments, e.g., monitors. The shield is intended to prevent the magnets from interfering with surrounding electronic elements.

Further known are bearing arrangements employing permanent magnets. For example, the German patent 2,951,010 describes a permanent magnet radial bearing for high-speed gas centrifuges. The bearing consists of two coaxial, permanent magnet rings which are arranged one inside the other and which, due to their identical magnetization in the preferred axial direction, repel one another. Such radial bearings are suitable for high-speed rotary centrifuges where the mass to be supported by the bearing is small. A transfer of this known bearing technology to larger machines is limited by the current limitations in the production of hollow, cylindrical magnets.

Another magnetic bearing is taught in the U.S. Pat. No. 4,186,567. Here, a rotary component is radially supported on a stationary component by magnetic rings on the two components. The rings are magnetized axially and are disposed one above the other in such a manner that the direction of magnetization alternates. A permanent magnet and a diamagnetic body are arranged next to one another in the axial direction to stabilize the rotary component. This extra diamagnetic body required for axial stabilization is composed of a superconducting material and may, for instance, be in the form of a superconducting coil having a current density of approximately 105 amperes per square centimeter.

The Japanese publication 55-60719 discloses a bearing arrangement in which both the axial and the radial forces for a bearing are produced by permanent magnets. A shaft is mounted in a bearing housing and radial support is achieved by magnetic rings on the shaft and corresponding magnetic rings on the housing. As explained previously, the field lines running from the north pole to the south pole of superimposed magnets influence the magnetic field at the surface. Hence, the arrangement known from the Japanese publication is unable to create a surface having an optimun unipolarity with reference to the surface of an oppositely disposed component.

SUMMARY OF THE INVENTION

It is an object of the invention to provide a magnet capable of producing a substantially unipolar magnetic field.

Another object of the invention is to provide a magnet which includes a plurality of magnetic bodies assembled in such a way that the magnet can generate a substantially unipolar magnetic field in the region of its surface.

An additional object of the invention is to provide a floating magnetic bearing which enables the flotation forces to be produced by using magnets capable of generating substantially unipolar magnetic fields.

A further object of the invention is to provide a floating magnetic bearing which allows the flotation forces to be created by using permanent magnets.

It is also an object of the invention to provide a floating magnetic bearing which makes it possible to produce the flotation forces using only permanent magnets capable of generating substantially unipolar magnetic fields in the regions of their surfaces.

Yet another object of the invention is to provide a method of making a magnet capable of producing a substantially unipolar magnetic field.

One more object of the invention is to provide a method of making a floating magnetic bearing which enables the flotation forces to be generated by using magnets capable of creating substantially unipolar magnetic fields.

Still a further object of the invention is to provide a method of making a floating magnetic bearing which permits the flotation forces to be produced by using permanent magnets.

The preceding objects, as well as others which will become apparent as the description proceeds, are achieved by the invention.

One aspect of the invention resides in a magnet. The magnet has a peripheral surface and comprises a plurality of magnetic bodies each having a first surface portion constituting part of the peripheral surface and a second surface portion which includes a concealed section. A diamagnetic or paramagnetic first covering is provided on each of the concealed sections. The coverings constitute regions through which the magnetic field lines can flow from the north poles to the south poles.

Each of the first coverings may, in turn, be provided with a magneically conductive covering. The covered magnetic bodies are preferably assembled so that a substantially unipolar magnetic field is created in the region of the peripheral surface of the magnet.

In one embodiment of the magnet, each of the magnetic bodies is generally pyramidal and each of the first or peripheral surface portions is substantially part-spherical. The magnetic bodies are assembled so as to define a substantially spherical element.

In another embodiment of the magnet, each of the magnetic bodies constitutes a segment of a substantially circular disc. The magnetic bodies are assembled so as to define a solid, substantially cylindrical element.

In an additional embodiment of the magnet, each of the magnetic bodies constitutes a segment of a substantially circular ring. The magnetic bodies are assembled so as to define a hollow, substantially cylindrical element.

The unipolar region over the surface of a magnet constructed in accordance with the invention causes the magnet to remain steady when this surface is disposed opposite a complementary magnetic surface of the same polarity. If, for example, the magnet is constructed as a cylinder whose outer surface has a given polarity, it will float essentially without motion in a hollow cylinder having an internal surface of this polarity and an internal diameter greater than the outer diameter of the first cylinder.

Another aspect of the invention resides in a magnetic device which comprises a stationary member and a rotary member. A first one of the members accommodates at least a portion of the second member, and the first member is provided with a ring-like first magnetic element which surrounds the second member. The portion of the second member accommodated by the first member is provided with a second magnetic element having a generally circular peripheral surface and a substantially unipolar magnetic field in the region of the peripheral surface. The two members are arranged to float relative to one another, and the second member includes a sleeve which surrounds the peripheral surface of the second magnetic element.

The second magnetic element may also have a ring-like configuration. The first and second magnetic elements are preferably permanently magnetized.

The second member may include a shaft and the first member may include a housing for the shaft. The housing can constitute a stator and the shaft can constitute a rotor.

At least one of the magnetic elements, advantageously the second magnetic element, can comprise an assembly of magnetic bodies. Each of the magnetic bodies can constitute a segment of a circular ring having a surface portion which includes a concealed section, and a fast covering may be provided on at least some of these sections.

The first magnetic element may surround the second magnetic element. The first magnetic element can here be radially magnetized, that is, the north and south poles of the first magnetic element can be disposed opposite one another in the radial direction of the first magnetic element. The magnetic elements may be disposed in the region of the center of the first member or housing.

The first magnetic element has a first surface portion facing the second magnetic element and a second surface portion which includes a section facing in a different direction. A fast covering can be provided on such section.

The housing and the shaft can have substantially parallel axes, and the housing may be provided with a first magnet while the shaft is provided with a second magnet which is disposed opposite the first magnet in axial direction of the housing and the shaft. These magnets are arranged with like poles facing one another in order to position the housing and the shaft relative to one another in axial direction thereof.

The housing and the shaft can each be provided with a flange, and the magnets may be mounted on the respective flanges. The flanges are preferably annular.

Each of the magnets has a first surface portion facing the other of the magnets and a second surface portion which includes a section facing in a different direction. A fast covering may be provided on such sections.

The housing or the shaft may have axially spaced first and second flanges, and the flange on the other of these members may be disposed between the first and second flanges. The flange located between the first and second flanges then has first and second surfaces which respectively face the first and second flanges. The first surface and first flange are provided with a first pair of confronting magnets, and the second surface and second flange are provided with a second pair of confronting magnets. The magnets are axially magnetized, i.e., the magnets are magnetized so that the north pole and south pole of each magnet are disposed opposite one another in axial direction of the housing and the shaft, and the magnets of each pair are arranged with like poles facing one another.

The axially magnetized magnets which are alternately connected to the shaft and the housing in axial direction thereof and are provided with a covering in accordance with the invention effect axial stabilization of the shaft and the housing. These magnets are advantageously ring-shaped or annular. The arrangement of the individual magnetic bodies of the shaft within a sleeve which magnetically constitutes air produces a substantially unipolar magnetic field in the region of the surface of the shaft.

The ring-shaped or annular, radially magnetized magnets mounted on the housing and the shaft, respectively, provide a high degree of radial stabilization of the shaft with reference to the housing. The magnets may be disc-shaped and several magnets may be arranged one above the other on both the housing and the shaft. A grouped arrangement of the radially acting magnets allows support to be obtained over a long axial stretch. The support may be adjusted to the requirements by appropriately increasing the number of magnets.

The novel features which are considered as characteristic of the invention are set forth in particular in the appended claims. The improved magnet and magnetic bearing, however, will be best understood upon perusal of the following detailed description of certain specific embodiments when read in conjunction with the accompanying drawings.

DESCRIPTION OF THE PREFERRED EMBODIMENTS

Figure 1:
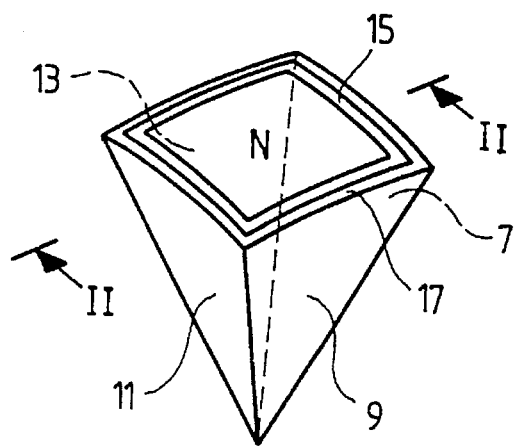
FIG. 1 is a perspective view of one embodiment of a magnetic unit according to the invention.
Figure 2:
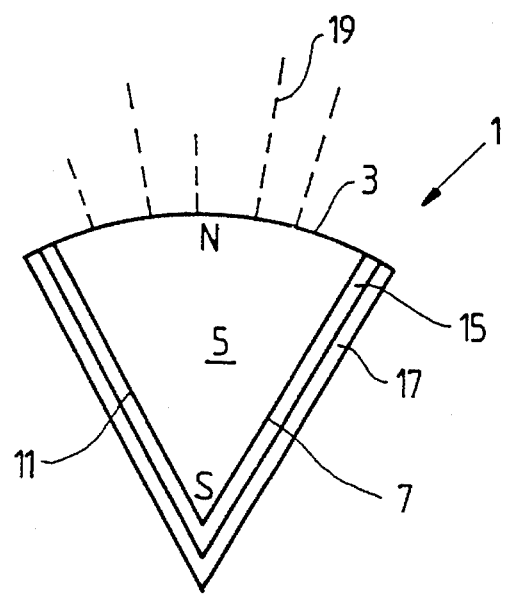
FIG. 2 is a view in the direction of the arrows II—II of FIG. 1.

FIGS. 1 and 2 illustrate a pyramidal magnetic unit 1. The magnetic unit 1 comprises a pyramidal body 5 having a base or first surface portion 3 and a second surface portion including four sections 7,9,11,13 which respectively form the four side faces of the body 5. The base 3 is part-spherical. The body 5 consists of a magnetic material, preferably a permanently magnetized material. Examples of magnetic materials which may be used for the body 5 are Sm12Co17, neodymium and the rare earth metals. The polarization of the magnetic body 5 is such that the north pole is located at the part-spherical base 3 and the south pole is located at the tip of the magnetic body 5.

The four side faces 7,9,11,13 of the magnetic body 5 are provided with a paramagnetic or diamagnetic first layer or covering 15. The layer 15 forms a flow region through which the magnetic field lines of the magnetic body 5 can flow from the north pole to the south pole. By way of example, the layer 15 can be composed of copper, plastic or wood.

A magnetically conductive second layer or covering is provided over the first covering 15. The second layer 17 is composed of a material which blocks the lines of force or field lines emanating from the magnetic body 5, i.e., the second layer 17 prevents the magnetic field lines from passing outwardly through the side faces of the pyramidal unit 1 and consequently guides the field lines through the unit 1. The second layer 17 may, for instance, be composed of an MU metal Vacoperm 100 marketed by vacuum-schmelze GmbH, D-W-6450 Hanau 1, Germany.

The second layer 17, ensures that the field lines of the south pole are conducted through the layer 15. Only the field of the north pole manifests itself at the base 3 of the magnetic body 5. As shown in FIG. 2, the field lines 19 of the north pole emanate from the base 3 perpendicular thereto.

As mentioned in general earlier, "packaged" magnets of this type are known. These known "packaged" magnets, which are referred to as canned magnets, consist of a magnetic body and a blocking layer. They are used in television and radio technology, weighing scales and other areas where the magnetic field must be blocked in order to prevent interference with neighboring electronic elements.

Figure 3:
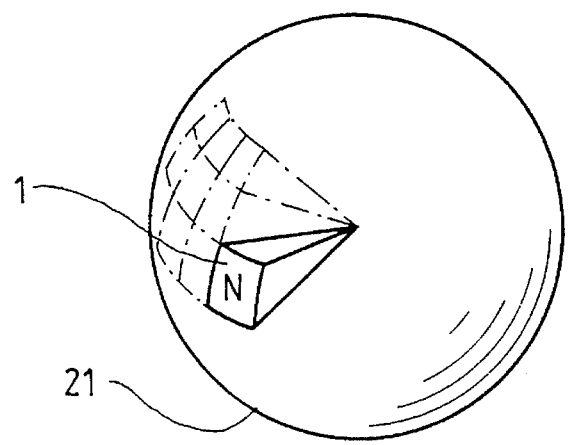
FIG. 3 illustrates a spherical magnet assembled from a plurality of the magnetic units of FIG. 1.

FIG. 3 schematically illustrates a spherical magnet 21 which is assembled from a plurality of the pyramidal magnetic units 1. The peripheral surface of the spherical magnet 21 is made up of the uncovered, part-spherical bases 3 of the magnetic bodies 5, the end faces of the conducting layers 15, and the end faces of the layers 17. The end faces of the layers 15 and 17 are disposed between neighboring bases 3 which form north poles as indicated above. The layers 15 and 17 separate the individual magnetic bodies 5, as well as the magnetic fields of the individual magnetic bodies 5, from one another. The magnetic screening of the magnetic bodies 5 from each other makes it possible to assemble the magnetic units 1 into a sphere. It will be observed that the side faces 7,9,11,13 of the magnetic bodies 5 are concealed.

The spherical magnet 21 exhibits the desired unipolar magnetic field at a predetermined distance from its peripheral surface.

Figure 10:
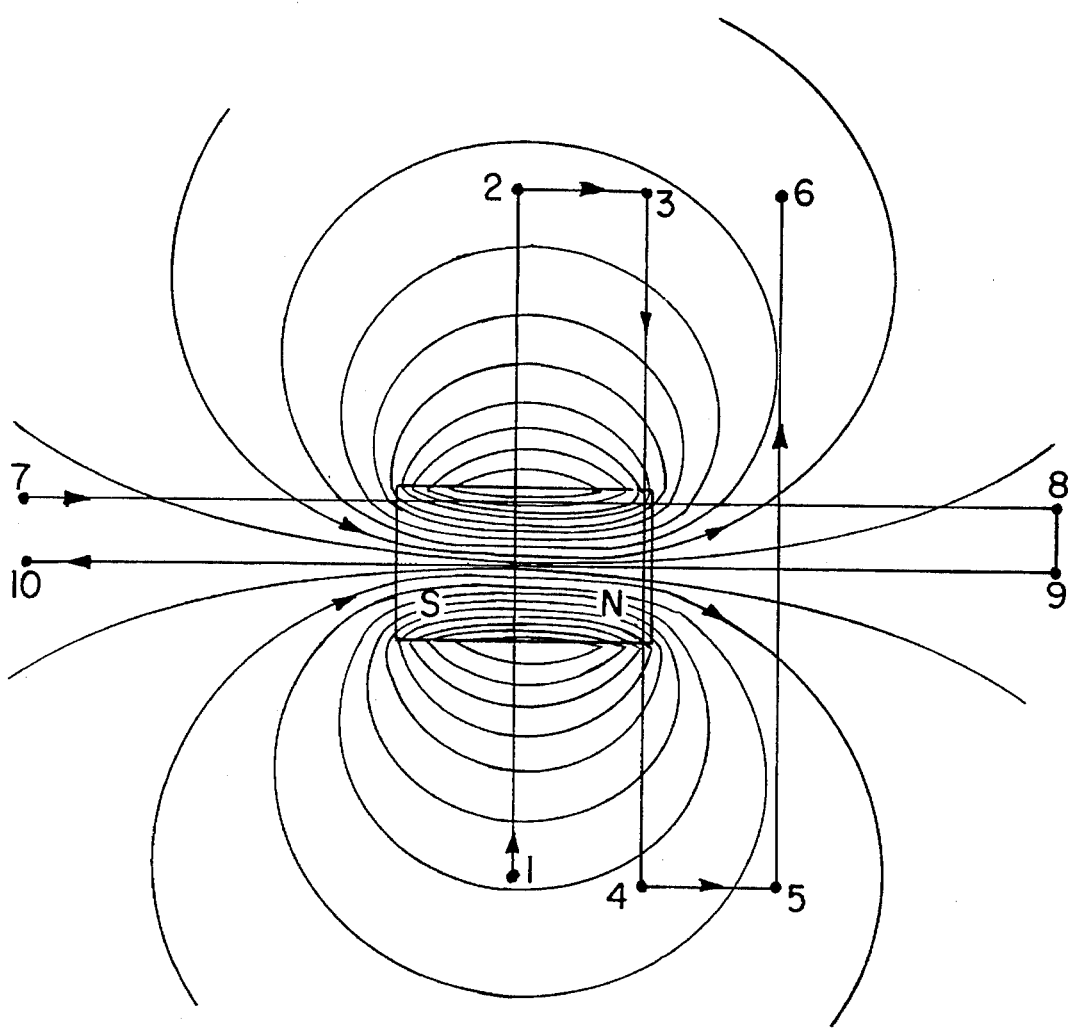
FIG. 10 shows a bar magnet and its magnetic field lines.

FIG. 10 illustrates an uncovered bar magnet and its field lines. It can be seen that the field lines leave the magnet via the end face at the north pole, flow to the south pole along curved tracks and reenter the magnet through the end face at the south pole.

Figure 11:
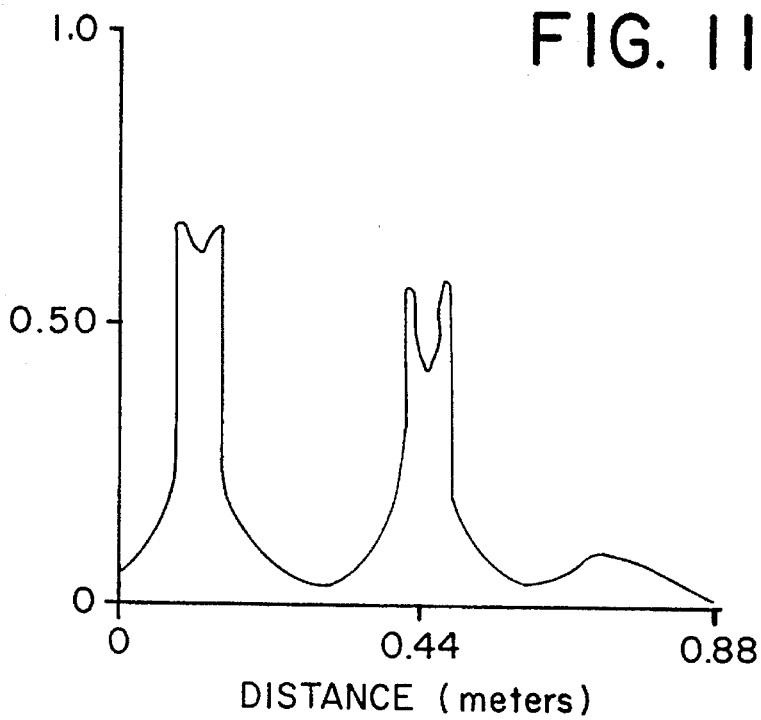
FIG. 11 is a plot of flux density versus distance for a first path through the magnetic field of the bar magnet of FIG. 10.
Figure 12:
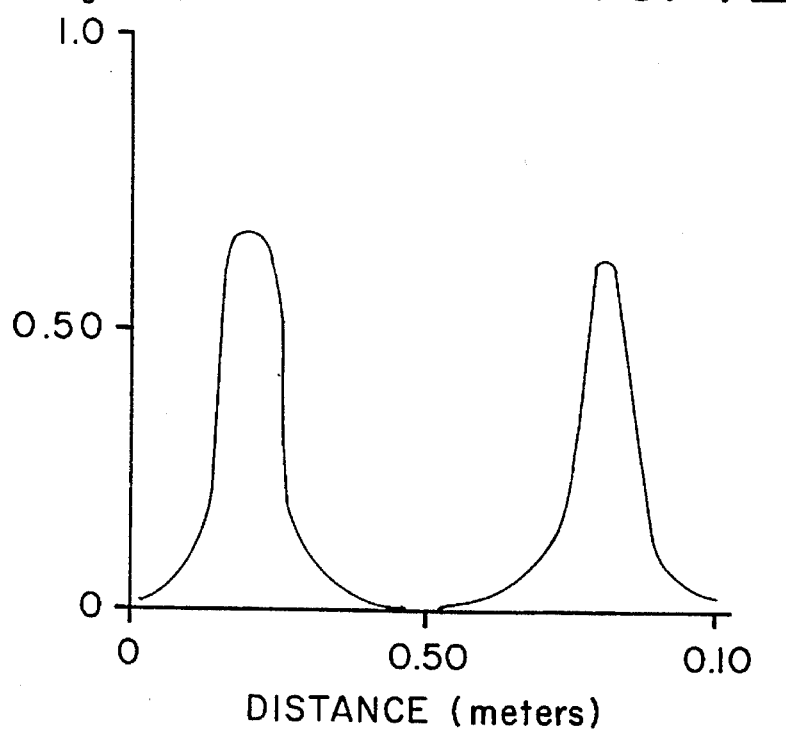
FIG. 12 is a plot of flux density versus distance for a second path through the magnetic field of the bar magnet of FIG. 10.

A first path through the magnetic field of the bar magnet is defined by the points 1,2,3,4,5,6 while a second path through such field is defined by the points 7,8,9,10. Precise measurements of the flux density along these paths were performed by ETH of Zurich, Switzerland. These measurements were then used to obtain the plots of flux density versus distance shown in FIGS. 11 and 12. FIG. 11 illustrates the variation of flux density along the path 1–6 whereas FIG. 12 illustrates the variation of flux density along the path 7–10. The highest flux density along the path 1–6 occurs between points 1 and 2 directly over the surface of the bar magnet (see the highest peaks of the curve in FIG. 11). Along the path 7–10, the highest flux density is between points 7 and 8 and again occurs over the surface of the bar magnet.

Figure 13:
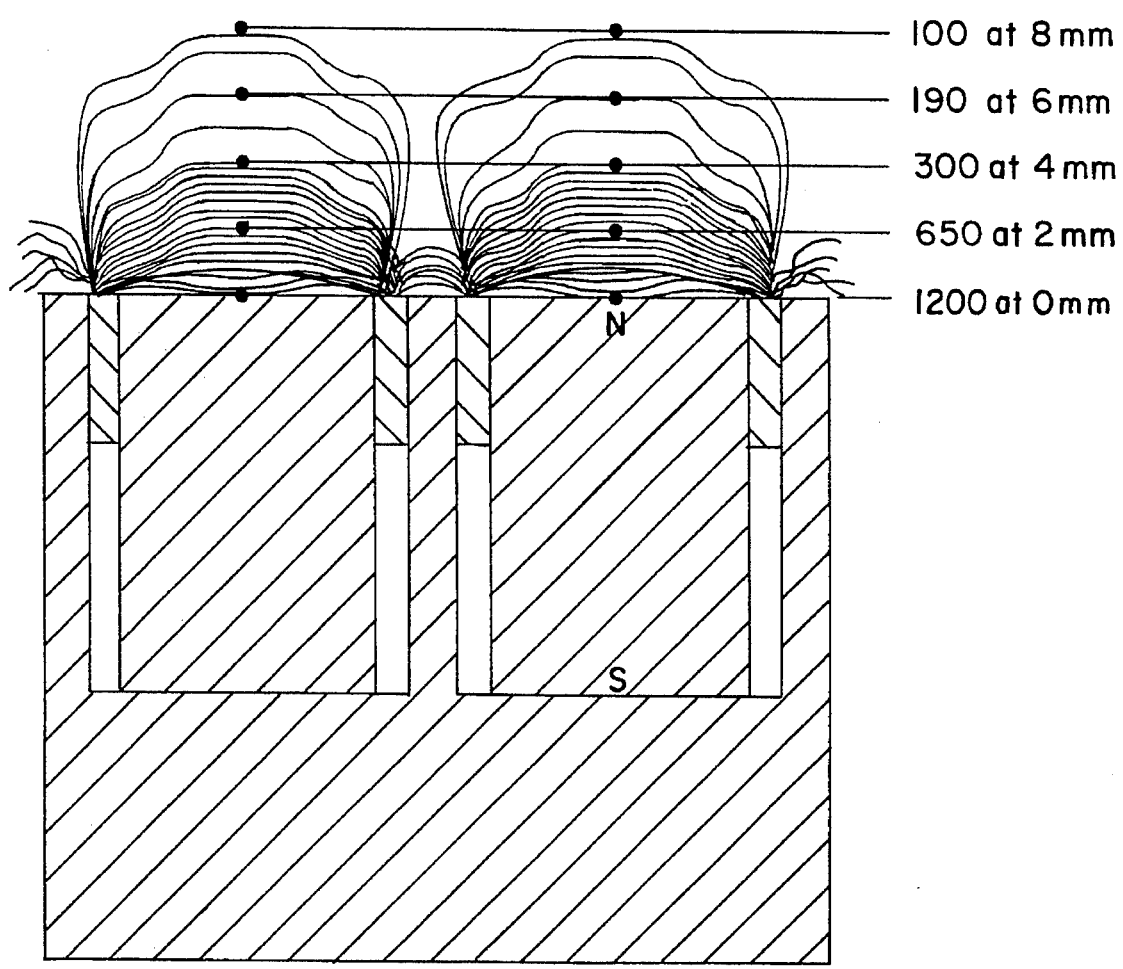
FIG. 13 is a cross section through two neighboring magnets provided with coverings according to the invention and shows the field strengths of the magnets.

FIG. 13 shows two bar magnets which are arranged side-by-side. The upper surfaces of these bar magnets are exposed and define north poles while the lower surfaces define south poles and are covered by a magnetically conductive material. The lateral surfaces are provided with pairs of layers in accordance with the invention.

Using the most modern measuring instruments, precise measurements of the field strengths were made at various distances from the exposed surfaces of the jacketed bar magnets. The results of these measurements are shown in FIG. 13. The measurements indicate that above the exposed surfaces, and beyond 3 millimeters from the latter, the magnetic field is exclusively "north". At the junction between the jacketed magnets, the short-circuited field lines with south polarity are still present and project from the surface for a distance of less than about 3 millimeters. The region containing the field lines with south polarity constitutes a transition region. Beyond this transition region is a unipolar region.

If, as illustrated in FIG. 3, a plurality of the pyramidal magnetic units 1 are assembled to form the spherical magnet 21, the field lines of the internal poles of the magnetic units 1 flow along the layers 17 through the layers 15. These field lines then exit from the peripheral surface of the spherical magnet 21 and manifest themselves up to a predetermined distance from such surface as demonstrated in FIG. 13. Beyond this predetermined distance lies a unipolar region at a spacing from the peripheral surface.

Figure 4:
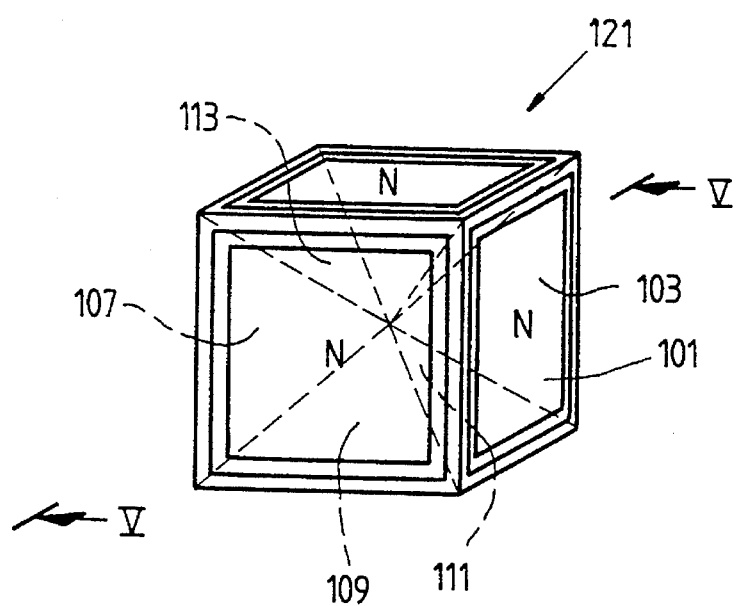
FIG. 4 is a perspective view of a parallelepipedal magnet assembled from a plurality of magnetic units in accordance with another embodiment of the invention.
Figure 5:
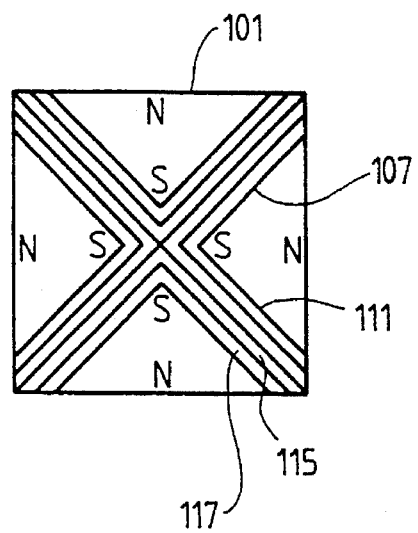
FIG. 5 is a view in the direction of the arrows V—V of FIG. 4.

Another embodiment is shown in FIGS. 4 and 5 where the reference numeral 101 identifies individual magnetic units such as the magnetic unit 1 of FIG. 1. The magnetic units 101 comprise magnetic bodies which, like the magnetic body 5 of FIG. 1, are pyramidal. However, the bases or first surface portions 103 of the magnetic bodies of FIGS. 4 and 5 are planar and square rather than part-spherical.

Each magnetic body in FIGS. 4 and 5 again has a second surface portion which includes four sections 107,109,111, 113 respectively constituting the four side faces of the pyramidal magnetic bodies. Analogously to FIGS. 1–3, the side faces 107,109,111,113 are provided with a diamagnetic or paramagnetic first layer or covering 115 which, in turn, is overlaid with a magnetically conductive second layer or covering 117.

Six of the magnetic units 101 can be assembled to form a parallelepipedal magnet 121. The magnetic units 101 are arranged in such a manner that the bases 103 of the pyramidal magnetic bodies coincide with the faces of the parallelepipedal magnet 121, i.e., the bases 103 constitute part of the peripheral surface of the magnet 121. Since the bases 103 are square, the parallelepipedal magnet 121 here has the configuration of a cube.

The side faces 107,109,111,113 of the magnetic bodies are again concealed.

At a predetermined distance from the surface of the magnet 121, the magnetic field around the magnet 121 is unipolar. The magnetic field has northern polarity when the bases 103 of the pyramidal magnetic bodies define north poles and the tips define south poles. The magnetic field has southern polarity when the polarities of the pyramidal magnetic bodies are reversed.

Figure 6:
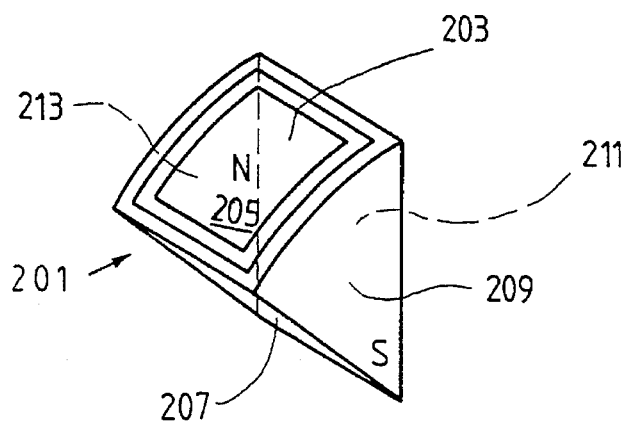
FIG. 6 is a perspective view of an additional embodiment of a magnetic unit according to the invention.
Figure 7:
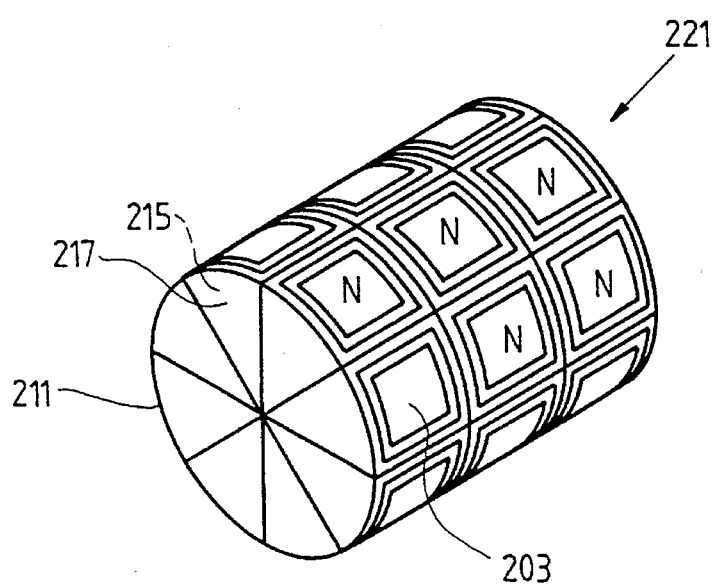
FIG. 7 is a perspective view of a solid cylinder assembled from a plurality of the magnetic units of FIG. 6.

A further embodiment is shown in FIGS. 6 and 7 where the reference numeral 201 identifies an individual magnetic unit such as the magnetic unit 1 of FIG. 1.

Each magnetic unit 201 comprises a magnetic body 205 in the form of a segment of a circular disc. The magnetic bodies 205 have a base or first surface portion 203 and a second surface portion including four sections 207,209,211, 213 which respectively constitute the four side faces of the segmental magnetic bodies 205. The bases 203 are part-circular, and each base 203 constitutes part of a cylindrical surface. The polarities of the magnetic bodies 205 are such that the bases 203 define north poles while the apices of the magnetic bodies 205 define south poles.

The side faces 207,209,211,213 of the magnetic bodies 205 are provided with a paramagnetic or diamagnetic first layer or covering 215. Each of the layers 215 is, in turn, provided with a magnetically conductive second layer or covering 217.

In the illustrated embodiment, a magnet in the form of a circular disc can be formed by assembling eight of the magnetic units 201. The magnetic units 201 are arranged such that the bases 203 of the magnetic bodies 205 are located at the circular peripheral surface of the disc. The side faces 207,211 of the magnetic bodies 205 are concealed inside such disc.

The circular peripheral surface of the disc has an essentially northern polarity.

As shown in FIG. 7, a plurality of the discs can be disposed side-by-side with their longitudinal axes in register to form a solid cylindrical magnet 221. The two end faces of the solid cylindrical magnet 221 are magnetically neutral since each is covered by the layer 215 and layer 217. The cylindrical peripheral surface of the solid cylindrical magnet 221 has a polarity which is essentially north.

Figure 8:
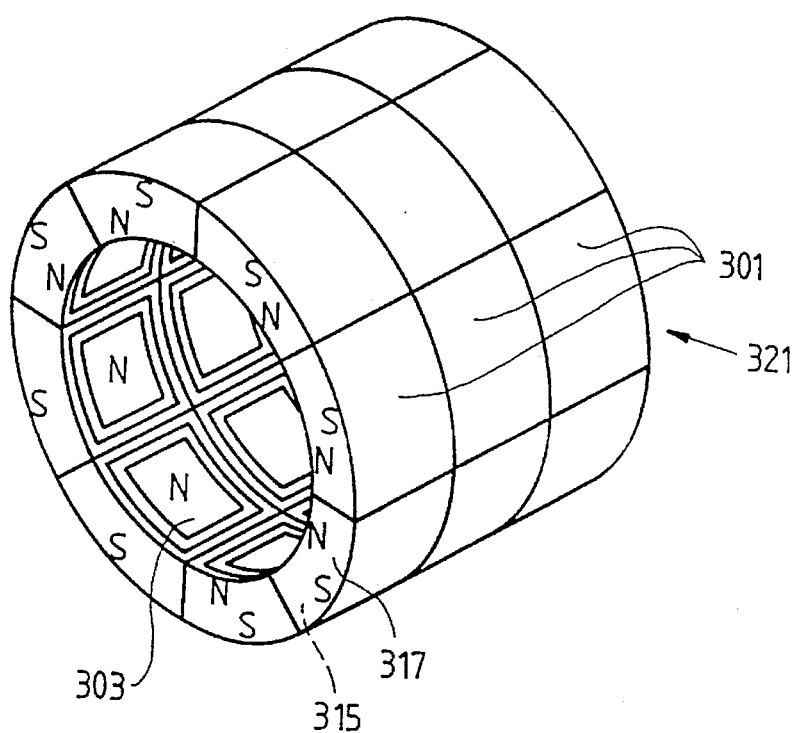
FIG. 8 is a perspective view of a hollow cylinder assembled from a plurality of magnetic units in accordance with a further embodiment of the invention.

An additional embodiment of the invention is illustrated in FIG. 8 where the reference numeral 301 identifies individual magnetic units such as the magnetic unit 1 of FIG. 1.

Each magnetic unit 301 includes a magnetic body which constitutes a segment of a disc-like ring. The magnetic bodies have a first face or surface portion 303 which is part-circular and has a radius equal to the inner radius of the ring. Each magnetic body further has a second surface portion made up of five sections, namely, the two side faces and two end faces of the respective segmental magnetic body, and a part-circular face having a radius equal to the outer radius of the ring. The part-circular faces 303 having the inner radius of the ring define north poles while the part-circular faces having the outer radius of the ring define south poles.

The side faces and end faces of each segmental magnetic body, as well as the part-circular face having the outer radius of the ring, are provided with a paramagnetic or diamagnetic first layer or covering 315. The layers 315 are, in turn, overlaid with a magnetically conductive second layer 317.

In the illustrated embodiment, a magnet in the form of a disc-like ring can be formed by assembling eight of the magnetic units 301, when the units 301 are assembled, the part-circular faces 303 having the inner radius of the ring lie on the circular internal peripheral surface of the ring whereas the part-circular faces having the outer radius of the ring lie on the circular external peripheral surface of the ring. The end faces of each segmental magnetic body are concealed in the ring.

The internal peripheral surface of the ring has an essentially northern polarity.

FIG. 8 shows that a plurality of the rings can be disposed side-by-side with their longitudinal axes in register to form a hollow cylindrical magnet 321. The cylindrical external peripheral surface, as well as the two end faces, of the hollow cylindrical magnet 321 are magnetically neutral because each is covered by a layer 315 and a layer 317. The cylindrical internal peripheral surface of the hollow magnet 321 has a polarity which is essentially north.

Figure 9:
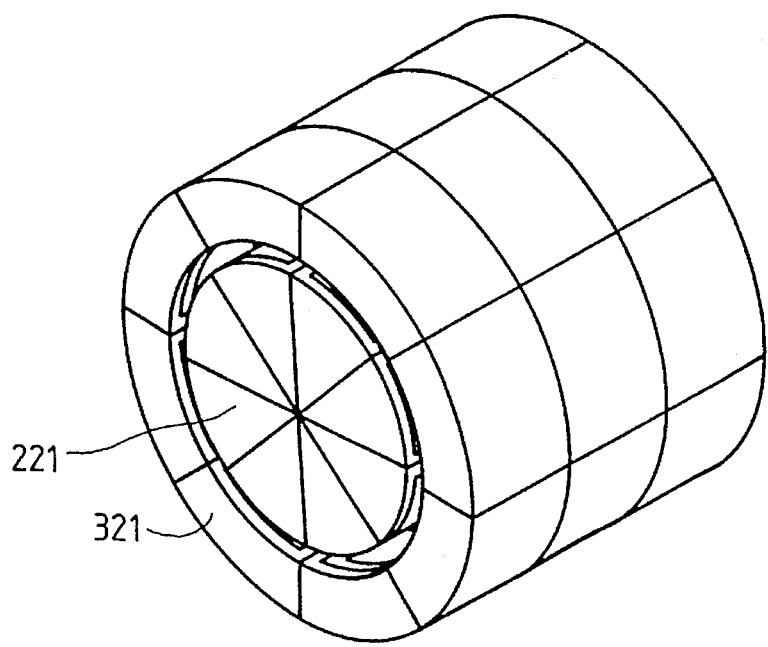
FIG. 9 shows the solid cylinder of FIG. 7 floating in the hollow cylinder of FIG. 8.

If the inner diameter of the hollow cylindrical magnet 321 is greater than the outer diameter of the solid cylindrical magnet 221 of FIG. 7, the solid cylindrical magnet 221 can be inserted in the hollow cylindrical magnet 321 as illustrated in FIG. 9. The solid cylindrical magnet 221 is repelled by the hollow cylindrical magnet 321 in radial direction of the magnets 221,321. Assuming that the magnetic forces are sufficiently great to support the weight of the solid cylindrical magnet 221, the latter remains motionless within the hollow cylindrical magnet 321 and floats therein. Support for the solid cylindrical magnet 221 in axial direction thereof can also be achieved magnetically.

The individual magnetic units 201 of the solid cylindrical magnet 221, as well as the individual magnetic units 301 of the hollow cylindrical magnet 321, can be held in assembled condition by an external jacket or sleeve composed of copper or another material which is paramagnetic. The magnets 221 and 321 can also be held together in any other suitable manner, e.g., by connecting adjoining faces of neighboring magnetic units 201,301 to one another.

Instead of providing an individual paramagnetic or diamagnetic first layer and an individual magnetically conductive second layer for each magnetic unit, a magnet according to the invention may include first and second layers which are common to more than one magnetic unit.

Figure 14:
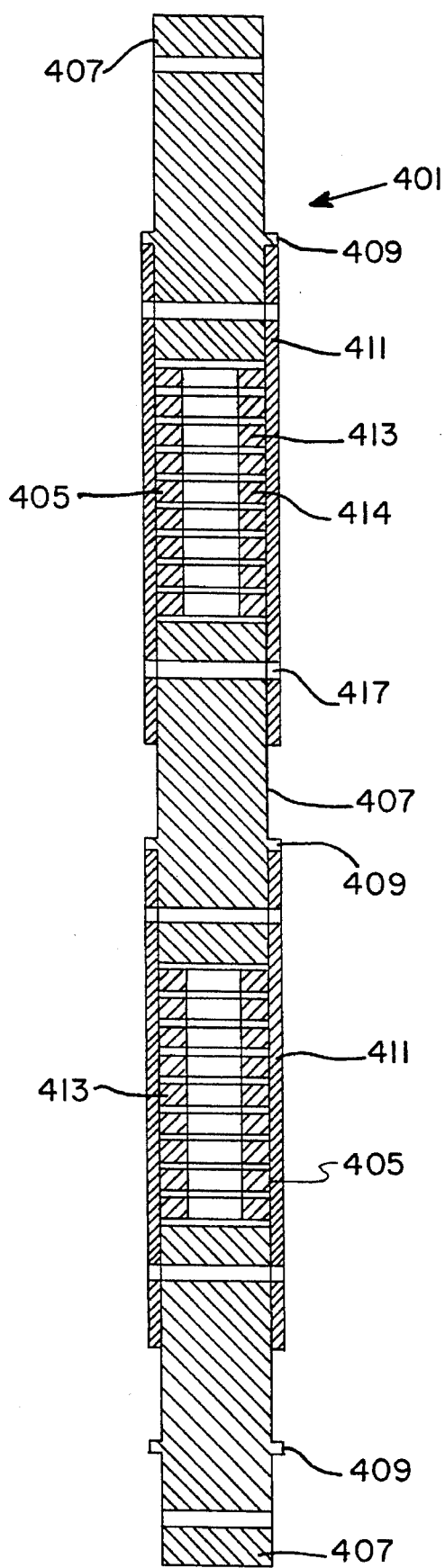
FIG. 14 is, a cross section through a shaft in accordance with the invention.

FIG. 14 shows a shaft 401 made up of several segments 405 and 407 which, in the illustrated embodiment, alternate with one another axially of the shaft 401. The segments 407 can, for example, be composed of circular discs such as those of FIG. 7.

The segments 405 include a plurality of annular magnets 413 which are superimposed on one another as considered in axial direction of the shaft 401 and define bores 414 in the segments 405. The bores 414 are coaxial with the annular magnets 413 and the shaft 401. The annular magnets 413 are radially magnetized or polarized, that is, the annular magnets 413 are magnetized in such a manner that the north pole and south pole of each magnet 413 are disposed opposite one another as considered in radial direction of the respective magnet 413. The north poles of the annular magnets 413 are adjacent the bores 414 while the south poles lie on the external peripheral surfaces of the magnets 413. Each of the annular magnets 413 may be assembled from a plurality of magnetic units such as the magnetic units 301 of FIG. 8. However, while the north poles of the magnetic units 301 are exposed and the south poles covered by the layers 315,317, the situation is reversed for the magnetic units of the annular magnets 413.

A sleeve 411 surrounds the annular magnets 413 of each of the shaft segments 405. The sleeves 411 consist of, for instance, chromium steel or copper. The shaft segments 407 are provided with circumferentially extending shoulders 409 and each of the sleeves 411 bears against one of the shoulders 409. The sleeves 411 are unreleasably connected to the shaft segments 407 by pins 417 or the like.

Figure 15:
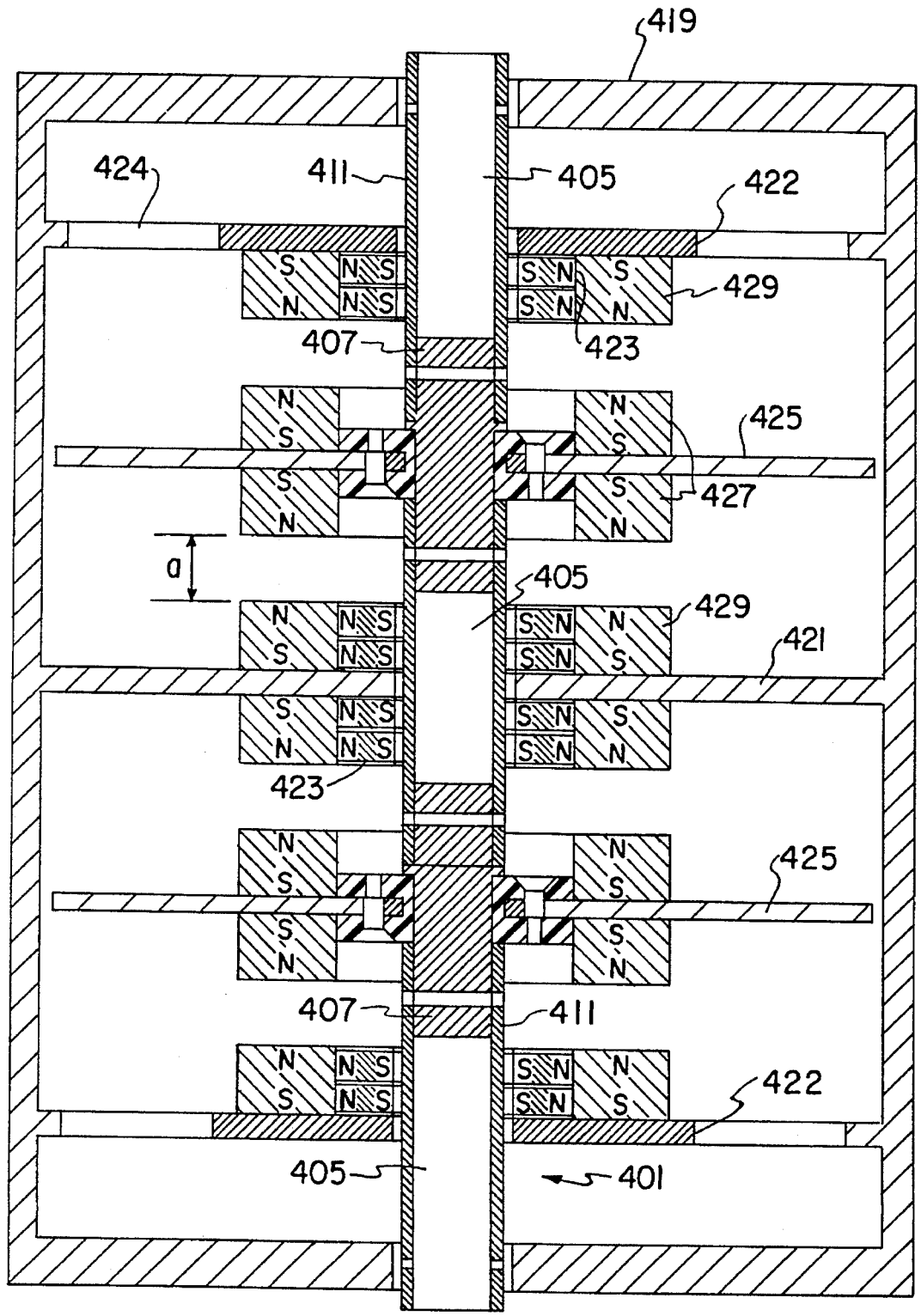
FIG. 15 is a cross section through a device having a floating bearing according to the invention.

FIG. 15 illustrates a device having floating magnetic bearings in accordance with the invention. The device includes a rotor in the form of the shaft 401 of FIG. 14 and a stator 419 in the form of a bearing housing which receives the shaft 401. It is possible for the shaft 401 to constitute the stator and for the housing 419 to constitute the rotor.

The housing 419 is provided with an annular flange 421 which is located at the center of the housing 419 and a pair of annular flanges 422 which are respectively located at the axial ends of the housing 419. The flanges 421,422 are coaxial with the housing 419 and the shaft 401. In order to reduce the mass of the housing 419, the flanges 421,422 can be provided with cutouts as indicated at 424 for one of the flanges 422.

The central portion of the flange 421 carries a plurality of annular magnets 423 which are superimposed with one another as considered in the axial direction of the housing 419. In the illustrated embodiment, two of the annular magnets 423 are disposed on one side of the flange 421 and two of the annular magnets 423 are disposed on the other side of the flange 421.

The central portions of the flanges 422 also support a plurality of superimposed annular magnets 423. However, each of the flanges 422 is provided with annular magnets 423 only on that surface of the respective flange 422 which faces the central flange 421.

The inner diameters of the annular magnets 423 are slightly greater than the outer diameters of the sleeves 411. The annular magnets 423 surround the sleeves 411 and the shaft segments 405 containing the annular magnets 413. Each of the annular magnets 423 is disposed radially opposite at least one of the annular magnets 413. The annular magnets 423 are radially magnetized such that the south poles of the annular magnets 423 are located at the inner peripheral surfaces of the magnets 423 while the north poles are located at the outer peripheral surfaces.

The annular magnets 413 of the shaft 401 and the annular magnets 423 of the housing 419 provide radial bearing support for the shaft 401 in the housing 419 so that the shaft 401 floats radially in the housing 419.

An annular flange 425 is fixed to each of the shaft segments 407 adjacent to the end faces of the sleeves 411. Each of the flanges 425 carries an annular magnet 427 on either side thereof. The annular magnets 427 are axially magnetized, that is, the annular magnets 427 are magnetized in such a manner that the north pole and south pole of an annular magnet 427 are disposed opposite one another as considered in the axial direction of the magnet 427.

The annular magnets 427 on the flanges 425 are superimposed with one another. The magnetizations of the two annular magnets 427 on each flange 425 are opposed, that is, the south poles of the magnets 427 are adjacent the respective flange 425 and face each other.

Annular magnets 429 similar to the annular magnets 427 are mounted on the flanges 421,422 of the housing 419 and surround the annular magnets 423. Thus, the annular magnets 429 are axially magnetized. The south poles of the annular magnets 429, like the south poles of the annular magnets 427, are adjacent the respective flanges 421,422.

The annular magnets 427,429 are superimposed as considered in axial direction of the shaft 401 and the housing 419, and the north pole of each annular magnet 427 faces the north pole of an annular magnet 429. The north poles of neighboring annular magnets 427 and 429 are spaced by a distance "a".

The superimposed annular magnets 427,429 provide axial bearing support for the shaft 401 in the housing 419 so that the shaft 401 floats axially in the housing 419.

The axial bearing capacity can be increased by providing additional magnets on the flanges 421,422,425 radially outwards of the magnets 427,429.

The magnets 413,423,427,429 preferably all constitute permanent magnets.

The surfaces of the magnets 423 other than those defining the south poles may be provided with first and second coverings or layers. Similarly, the surfaces of the magnets 427,429 other than those defining the north poles may be provided with first and second coverings or layers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A composite magnet having a first pole, a second pole and an exposed first surface only at one of said poles, said magnet comprising a plurality of magnetic bodies each having a first surface portion constituting part of said first surface of said composite magnet and a second surface portion having a concealed section at the other pole of said composite magnet; a first covering on at least some of said sections, said first covering being selected from the group consisting of diamagnetic and paramagnetic materials; and a magnetically conductive second covering on each of said first coverings such that each said first covering is disposed between said second covering and said second surface portions and said coverings confine the field lines of said other pole of said composite magnet to propagation through at least one of said coverings to thus establish a unipolar magnetic field in the region of but slightly spaced apart from said first surface of said composite magnet.

2. The magnet of claim 1, wherein each of said bodies is generally pyramidal and each of said first surface portions is substantially part-spherical, said bodies being assembled so as to define a substantially spherical element.

3. The magnet of claim 1, wherein the unipolar magnetic field is spaced apart from said first surface by a distance of not less than about 3 millimeters.

4. The magnet of claim 1, wherein said first covering consists of a material selected from the group consisting of copper, plastic and wood.

5. The magnet of claim 1, wherein said second layer consists of an MU metal.

6. A composite magnet having a first pole, a second pole and an exposed first surface only at one of said poles, said magnet comprising a plurality of magnetic bodies each having a first surface portion constituting part of said first surface of said composite magnet and a second surface portion having a concealed section at the other pole of said composite magnet; a first covering on at least some of said sections; and a second covering on each of said first coverings such that each said first covering is disposed between said second covering and said second surface portions, said second covering having a first magnetic conductivity and said first covering having a second magnetic conductivity less than said first magnetic conductivity and said coverings confining the field lines of said other pole of said composite magnet to propagation through at least one of said coverings to thus establish a unipolar magnetic field in the region of but slightly spaced apart from said first surface of said composite magnet.

\* \* \* \* \*